(12) United States Patent
Wu et al.

(10) Patent No.: US 10,181,924 B2
(45) Date of Patent: Jan. 15, 2019

(54) SELECTIVE CHANNEL CONTROL IN MULTI-CHANNEL PASSIVE OPTICAL NETWORKS (PONS)

(71) Applicant: Futurewei Technologies, Inc., Plano, TX (US)

(72) Inventors: Xuming Wu, Wuhan (CN); Yuanqiu Luo, Cranbury, NJ (US); Shengping Li, Wuhan (CN); Jianhe Gao, Wuhan (CN); Minghui Tao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/473,273

(22) Filed: Mar. 29, 2017

(65) Prior Publication Data
US 2017/0294982 A1    Oct. 12, 2017

Related U.S. Application Data

(60) Provisional application No. 62/319,556, filed on Apr. 7, 2016.

(51) Int. Cl.
*H04B 10/27* (2013.01)
*H04B 10/40* (2013.01)
(Continued)

(52) U.S. Cl.
CPC ............ *H04J 14/023* (2013.01); *H04B 10/27* (2013.01); *H04B 10/40* (2013.01); *H04J 14/0242* (2013.01); *H04J 14/08* (2013.01)

(58) Field of Classification Search
None
See application file for complete search history.

(56) References Cited

U.S. PATENT DOCUMENTS

2002/0146026 A1* 10/2002 Unitt .................. H04L 12/1886
                                                            370/428
2010/0221007 A1*  9/2010 Sakamoto ........... H04J 14/0226
                                                            398/67
(Continued)

FOREIGN PATENT DOCUMENTS

CN          101197637 A      6/2008
CN          104040961 A      9/2014

OTHER PUBLICATIONS

Foreign Communication From a Counterpart Application, PCT Application No. PCT/CN2017/079329, English Translation of International Search Report dated Jun. 22, 2017, 4 pages.

(Continued)

*Primary Examiner* — Darren E Wolf
(74) *Attorney, Agent, or Firm* — Conley Rose, P.C.

(57) ABSTRACT

An OLT comprises: a memory; a processor coupled to the memory and configured to: determine each of a plurality of channels associated with an ONU, select a first channel from among the channels, and generate a first message comprising at least one field instructing enablement or disablement of the first channel; and a transmitter coupled to the processor and configured to transmit the first message to the ONU. A method implemented in an OLT, the method comprises: determining each of a plurality of channels associated with an ONU; selecting a first channel from among the channels; generating a first message comprising at least one field instructing enablement or disablement of the first channel; and transmitting the first message to the ONU.

17 Claims, 8 Drawing Sheets

(51) Int. Cl.
*H04B 10/50* (2013.01)
*H04B 10/60* (2013.01)
*H04J 14/02* (2006.01)
*H04J 14/08* (2006.01)

(56) References Cited

U.S. PATENT DOCUMENTS

2012/0008937 A1* 1/2012 Cheng .................. H04B 10/671
398/1
2014/0334823 A1 11/2014 Tamaki et al.
2015/0055955 A1 2/2015 Kim et al.

OTHER PUBLICATIONS

"40-Gigabit-capable passive optical networks (NG-PON2): Transmission Convergence Layer Specification," International Telecommunication Union, Telecommunication Standardization Sector of ITU, ITU-T G.989.3, Oct. 2015, 289 pages.
"IEEE Standard for Ethernet," Section Five, IEEE 802.3, 2012, 844 pages.
"IEEE P1904.1™ /D3A Draft Standard for Service Interoperability in Ethernet Passive Optical Networks (SIEPON)," Standards Development Board of the IEEE Communications Society, Apr. 2013, 829 pages.
Kramer, G., "Channel (Wavelength) Control Protocol," Mar. 2017, 19 pages.

* cited by examiner

| SIZE (OCTETS) | FIELD (NAME) | VALUE AND NOTES |
|---|---|---|
| 21 | eOAMPDU HEADER | VARIES |
| 1 | OPCODE | 0xFC |
| 1 | CHID | ONU CHANNEL ID |
| 37 | PAD | 0x00-...00 |
| 4 | FCS | VARIES |

FIG. 5

| SIZE (OCTETS) | FIELD (NAME) | VALUE AND NOTES |
|---|---|---|
| 21 | eOAMPDU HEADER | VARIES |
| 1 | OPCODE | 0xFD |
| 1 | CHID | ONU CHANNEL ID |
| 37 | PAD | 0x00-...00 |
| 4 | FCS | VARIES |

FIG. 6

| SIZE (OCTETS) | FIELD (NAME) |
|---|---|
| 6 | DESTINATION ADDRESS |
| 6 | SOURCE ADDRESS |
| 2 | LENGTH/TYPE=0x8808 |
| 2 | OPCODE=0x0009 |
| 4 | TIMESTAMP |
| 1 | Rx CONFIGURATION |
| 1 | Tx CONFIGURATION |
| 38 | PAD |
| 4 | FCS |

| BIT | Rx CONFIGURATION FIELD | VALUES |
|---|---|---|
| 0 | Rx OF CHANNEL 0 | 0-Rx IS CONFIGURED TO BE OFF<br>1-Rx IS CONFIGURED TO BE ON |
| 1 | Rx OF CHANNEL 1 | 0-Rx IS CONFIGURED TO BE OFF<br>1-Rx IS CONFIGURED TO BE ON |
| 2 | Rx OF CHANNEL 2 | 0-Rx IS CONFIGURED TO BE OFF<br>1-Rx IS CONFIGURED TO BE ON |
| 3 | Rx OF CHANNEL 3 | 0-Rx IS CONFIGURED TO BE OFF<br>1-Rx IS CONFIGURED TO BE ON |
| 4-7 | RESERVED | RESERVED |

| BIT | Tx CONFIGURATION FIELD | VALUES |
|---|---|---|
| 0 | Tx OF CHANNEL 0 | 0-Tx IS CONFIGURED TO BE OFF<br>1-Tx IS CONFIGURED TO BE ON |
| 1 | Tx OF CHANNEL 1 | 0-Tx IS CONFIGURED TO BE OFF<br>1-Tx IS CONFIGURED TO BE ON |
| 2 | Tx OF CHANNEL 2 | 0-Tx IS CONFIGURED TO BE OFF<br>1-Tx IS CONFIGURED TO BE ON |
| 3 | Tx OF CHANNEL 3 | 0-Tx IS CONFIGURED TO BE OFF<br>1-Tx IS CONFIGURED TO BE ON |
| 4-7 | RESERVED | RESERVED |

| SIZE (OCTETS) | FIELD (NAME) | VALUE AND NOTES |
|---|---|---|
| 21 | eOAMPDU HEADER | VARIES |
| 1 | OPCODE | 0xAA |
| 1 | MODE | 0x00: TURN OFF THE CHANNEL SPECIFIED BY ONU CHID 0x01: TURN ON THE CHANNEL SPECIFIED BY ONU CHID OTHER VALUES RESERVED |
| 1 | CHID | ONU CHANNEL ID |
| 36 | PAD | 0x00-...00 |
| 4 | FCS | VARIES |

810 — 21/eOAMPDU HEADER
820 — OPCODE
830 — MODE
840 — CHID
850 — PAD
860 — FCS

| OCTET | CONTENT | DESCRIPTION |
|---|---|---|
| 1-2 | ONU-ID | DIRECTED OR BROADCAST ONU-ID. AS A BROADCAST MESSAGE, ONU-ID = 0x03FF |
| 3 | 0x12 | MESSAGE TYPE ID "Sleep_Allow" |
| 4 | SeqNo | UNICAST OR BROADCAST PLOAM SEQUENCE NUMBER, AS APPROPRIATE |
| 5 | 0000 000A | THIS BYTE IS A BIT FIELD WITH THE FOLLOWING SIGNIFICANCE: A = 0-SLEEP ALLOWED OFF. A = 1-SLEEP ALLOWED ON. OTHER VALUES RESERVED |
| 6 | CH ID | THE WAVELENGTH CHANNEL WHICH SHOULD CONDUCT POWER SAVING |
| 7-40 | PADDING | SET TO 0x00 BY THE TRANSMITTER; TREATED AS "DON'T CARE" BY THE RECEIVER |
| 41-48 | MIC | MESSAGE INTEGRITY CHECK |

| SIZE (OCTETS) | FIELD (NAME) | VALUE AND NOTES |
|---|---|---|
| 6 | DESTINATION ADDRESS | 0x01-80-C2-00-00-01 (MAC CONTROL MULTICAST ADDRESS) |
| 6 | SOURCE ADDRESS | OLT MAC ADDRESS |
| 2 | LENGTH/TYPE | 0x88-08 |
| 2 | OPCODE | 0xFF-FE |
| 3 | OUI | OUI_B |
| 1 | MessageId | 0x12 |
| 1 | PowerDownMode | DESIGNATES THE TARGET SLEEP MODE FOR THE ONU OR REQUESTS THE ONU TO WAKE UP. THE FOLLOWING VALUES ARE DEFINED: 0x00: WAKE UP 0x01: Tx 0x02: TRx 0x03: TxorTRx OTHER VALUES ARE RESERVED AND IGNORED ON RECEPTION |
| 2 | TmpSleepPeriod | DESIGNATES THE DURATION OF THE SLEEP PERIOD TO BE USED DURING THIS POWER SAVING MODE. DURING THE REMAINING SLEEP CYCLES, SLEEP PERIOD USES THE DURATION OF SLEEP DURATION. THE VALUE CARRIED IN THIS FIELD IS EXPRESSED IN UNITS OF MILLISECONDS. 0xFFFF :ONU TURNS OFF THE CHANNEL SPECIFIED BY THE CHID FIELD |
| 1 | CHID | THE CHANNEL TO WHICH THE PowerDownMode MESSAGE APPLIES |
| 35 | PAD | VARIES |
| 4 | FCS | VARIES |

FIG. 9

| OCTET | CONTENT | DESCRIPTION |
|---|---|---|
| 1-2 | ONU-ID | |
| 3 | 0x10 | MESSAGE TYPE ID "Sleep_Request" |
| 4 | SeqNo | ALWAYS 0 |
| 5 | Activity_level | 0- Sleep_Request (AWAKE). <br> 1- Sleep_Request (DOZE). DOZE REQUEST, ONU RECEIVER ACTIVE - DURING LOW-POWER PERIODS OF DOZE MODE, THE ONU CAN RECEIVE DOWNSTREAM TRAFFIC. <br> 2- Sleep_Request (SLEEP). CYCLIC SLEEP REQUEST, ONU RECEIVER INACTIVE - DURING LOW-POWER PERIODS OF CYCLIC SLEEP MODE, THE ONU CANNOT RECEIVE DOWNSTREAM TRAFFIC. <br> OTHER VALUES RESERVED |
| 6 | CH ID | THE WAVELENGTH CHANNEL REQUESTING POWER SAVING |
| 7-40 | PADDING | SET TO 0x00 BY THE TRANSMITTER; TREATED AS "DON'T CARE" BY THE RECEIVER |
| 41-48 | MIC | MESSAGE INTEGRITY CHECK |

FIG. 11

| OCTET | CONTENT | DESCRIPTION |
|---|---|---|
| 1-2 | ONU-ID | DIRECTED OR BROADCAST ONU-ID. AS A BROADCAST MESSAGE, ONU-ID = 0x03FF |
| 3 | 0xFA | MESSAGE TYPE ID "Channel_Power_Control" |
| 4 | SeqNo | UNICAST OR BROADCAST PLOAM SEQUENCE NUMBER, AS APPROPRIATE |
| 5 | 0000 000A | THIS BYTE IS A BIT FIELD WITH THE FOLLOWING SIGNIFICANCE: <br> A = 0-THE ONU SHOULD TURN OFF THE CHANNEL SPECIFIED BY OCTET6. <br> A = 1-THE ONU SHOULD TURN ON THE CHANNEL SPECIFIED BY OCTET 6. <br> OTHER VALUES RESERVED |
| 6 | CH ID | WAVELENGTH CHANNEL ID |
| 7-40 | PADDING | SET TO 0x00 BY THE TRANSMITTER; TREATED AS "DON'T CARE" BY THE RECEIVER |
| 41-48 | MIC | MESSAGE INTEGRITY CHECK |

SELECTIVE CHANNEL CONTROL IN MULTI-CHANNEL PASSIVE OPTICAL NETWORKS (PONS)

CROSS-REFERENCE TO RELATED APPLICATIONS

This application claims priority to U.S. provisional patent application No. 62/319,556 filed on Apr. 7, 2016 by Futurewei Technologies, Inc. and titled "Optical Network Unit (ONU) Power Conservation in Multi-Channel Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. In other words, different wavelengths may be multiplexed together to share a single feeder fiber, and each wavelength may be shared by multiple users using TDM.

SUMMARY

In one embodiment, the disclosure includes an OLT comprising: a memory; a processor coupled to the memory and configured to: determine each of a plurality of channels associated with an ONU, select a first channel from among the channels, and generate a first message comprising at least one field instructing enablement or disablement of the first channel; and a transmitter coupled to the processor and configured to transmit the first message to the ONU. In some embodiments, each of the channels is associated with one of a plurality of transceivers in the ONU; each of the channels corresponds to a different wavelength; the at least one field comprises a CHID field identifying the first channel; the processor is further configured to: make a determination that the ONU is communicating traffic at less than a capacity of a plurality of transceivers in the ONU; and instruct, based on the determination and via the at least one field, the ONU to disable one of the transceivers; the processor is further configured to: make a determination that the OLT is not operating the first channel; and instruct, based on the determination and via the at least one field, the ONU to disable a transceiver of the ONU corresponding to the first channel; the processor is further configured to: make a first determination that the ONU is in an activation process; make a second determination that a first transceiver of a plurality of transceivers in the ONU is in operation for the activation process; and instruct, based on the first determination, based on the second determination, and via the at least one field, the ONU to disable each of the transceivers except for the first transceiver; the OLT further comprises a receiver configured to receive from the ONU a second message comprising a confirmation of the enablement or the disablement.

In another embodiment, the disclosure includes an ONU comprising: a first transceiver comprising a first transmitter and a first receiver; a second transceiver comprising a second transmitter and a second receiver; and a MAC component coupled to the first transceiver and the second transceiver and configured to: process a first message from an OLT, wherein the first message comprises at least one field instructing enablement or disablement of a first channel and a second channel, determine that the first transceiver is associated with the first channel, instruct the first transmitter to enable or disable based on the at least one field, instruct the first receiver to enable or disable based on the at least one field, determine that the second transceiver is associated with the second channel, instruct the second transmitter to enable or disable based on the at least one field, and instruct the second receiver to enable or disable based on the at least one field. In some embodiments, the at least one field comprises an opcode field, an Rx configuration field, and a tx configuration field, wherein the opcode field commands the ONU to instruct the first receiver and the second receiver to enable or disable based on the Rx configuration field, and wherein the opcode field commands the ONU to instruct the first transmitter and the second transmitter to enable or disable based on the Tx configuration field; the first receiver or the second receiver is configured to receive the first message; the first receiver and the second receiver are configured to receive the first message; the MAC component is further configured to generate a second message comprising a confirmation of the enablement or the disablement; the first transmitter or the second transmitter is configured to transmit the second message to the OLT; the first transmitter and the second transmitter are configured to transmit the second message to the OLT; the first channel corresponds to a first wavelength, and wherein the second channel corresponds to a second wavelength.

In yet another embodiment, the disclosure includes a method implemented in an OLT, the method comprising: determining each of a plurality of channels associated with an ONU; selecting a first channel from among the channels; generating a first message comprising at least one field instructing enablement or disablement of the first channel; and transmitting the first message to the ONU. In some embodiments, the method further comprises: making a determination that the ONU desires to communicate traffic at a higher capacity; and instructing, based on the determination and via the at least one field, the ONU to enable a transceiver in the ONU; the method further comprises: making a determination that the OLT will begin operation of a first channel; and instructing, based on the determination and via the at least one field, the ONU to enable a transceiver of the ONU corresponding to the first channel; the method further comprises: making a first determination that the ONU is transitioning from an activation process to a normal operation; making a second determination that a first transceiver of a plurality of transceivers in the ONU is in operation for the activation process; and instructing, based on the first determination, based on the second determination, and via the at least one field, the ONU to enable a second transceiver of the plurality of transceivers.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
Activity_level: activity level
ASIC: application-specific integrated circuit
AWG: arrayed waveguide grating
CHID, CH ID: channel ID
CO: central office
CPU: central processing unit
demux: demultiplexer
DSP: digital signal processor
eMPCPDU: extended MPCPDU
EO: electrical-to-optical
eOAMPDU: extended operations, administration, and maintenance protocol data unit
EPON: Ethernet PON
FCS: frame check sequence
FPGA: field-programmable gate array
FWI: forced wake-up indication
Gb/s: gigabits per second
GPON: gigabit PON
ITU-T G.989.3: ITU-T G.989.3, October 2015
ID: identification, identifier
IEEE: Institute of Electrical and Electronics Engineers
IEEE P1904.1: IEEE P1904.1/D3.4, April 2013
ITU-T: International Telecommunication Union Telecommunication Standardization Sector
LO: local oscillator
LWI: local wake-up indication
MAC: media access control
Mb/s: megabits per second
messageId: message ID
MIC: message integrity check
MPCPDU: Multi-point Control Protocol data unit
mux: multiplexer
NG-EPON: next-generation EPON
NG-PON2s: next generation PON 2s
OA: optical amplifier
OAMPDU: operations, administration, and maintenance protocol data unit
ODN: optical distribution network
OE: optical-to-electrical
OLT: optical line terminal
ONT: optical network terminal
ONU: optical network unit
opcode: operation code
OUI: organizationally-unique ID
PLOAM: physical layer operations, administration, and maintenance
PON: passive optical network
PowerDownMode: power down mode
P2MP: point-to-multipoint
RAM: random-access memory
RN: remote node
ROM: read-only memory
Rx, RX: receiver, receiver unit
SeqNo: sequence number
SRAM: static random-access memory
SSD-WDM-PON: single-scheduling domain WDM PON
TCAM: ternary content-addressable memory
TDM: time-division multiplexing
TDMA: time-division multiple access
TLV: type-length-value
TmpSleepPeriod: temporary sleep period
TRx: transceiver
TWDM: time- and wavelength-division multiplexing
Tx, TX: transmitter, transmitter unit
WDM: wavelength-division multiplexing
WDMA: wavelength-division multiple access
XGPON1s: 10 Gb/s capable PON1s.

Figure 1:
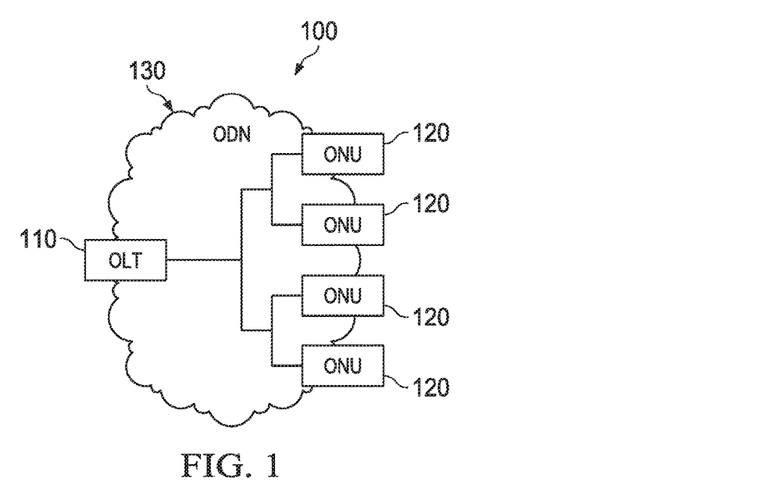
FIG. 1 is a schematic diagram of a PON.

FIG. 1 is a schematic diagram of a PON 100. The PON 100 comprises an OLT 110, a plurality of ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

Figure 2:
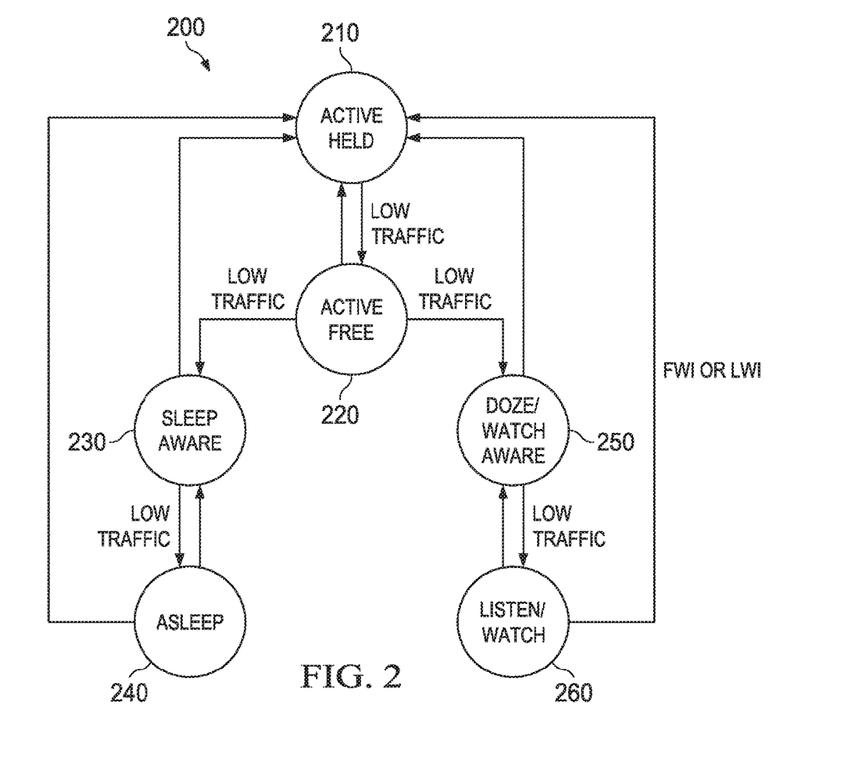
FIG. 2 is a state diagram of an ONU power-saving mechanism in GPONs.

FIG. 2 is a state diagram of an ONU power-saving mechanism 200 in GPONs. The ONUs 120 implement the ONU power-saving mechanism 200. The ONU power-saving mechanism 200 comprises six states: an active held state 210, an active free state 220, a sleep aware state 230, an asleep state 240, a doze/watch aware state 250, and a listen/watch state 260.

When an ONU 120 is in the listen watch state 260 and when the ONU 120 receives an FWI or an LWI, the ONU 120 enters the active held state 210 and turns on its transmitter. When the ONU 120 is in the active held state 210 or the active free state 220 and when the ONU 120 is experiencing light traffic, the ONU 120 enters either the asleep state 240 or the listen/watch state 260, both of which are low-power states. In the asleep state 240 and the listen/watch state 260, the ONU 120 transmitter is off, but the ONU 120 receiver periodically turns on to check for FWIs. However, the ONU 120 cannot turn off its receiver for long periods of time because it could otherwise miss FWIs.

Figure 3:
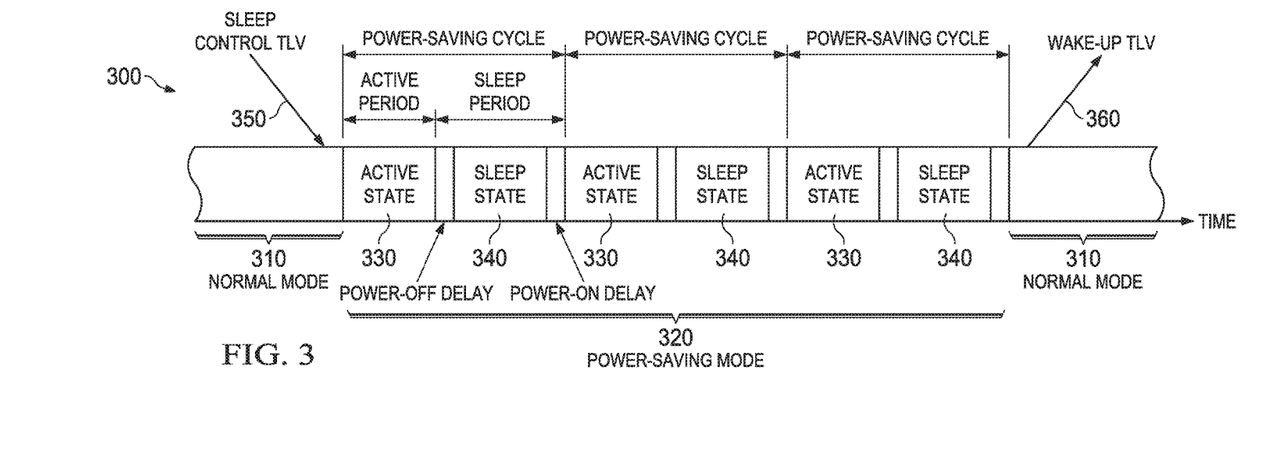
FIG. 3 is a state diagram of an ONU power-saving mechanism in EPONs.

FIG. 3 is a state diagram of an ONU power-saving mechanism 300 in EPONs. The ONUs 120 implement the ONU power-saving mechanism 300. The ONU power-saving mechanism 300 comprises two modes: a normal mode 310 and a power-saving mode 320.

An ONU 120 begins in the normal mode 310, changes to the power-saving mode 320 upon receiving a sleep control TLV 350, and changes back to the normal mode 310 upon transmitting a wake-up TLV 360. In the power-saving mode 320, the ONU 120 alternates between active states 330 in which a transmitter is on and sleep states 340 in which the transmitter is off. However, even in the sleep states 340 in which the transmitter is off, a receiver periodically turns on to check for gate MPCPDU messages. If the ONU 120 misses a gate MPCPDU message, then it cannot promptly respond to the OLT 110, thus delaying operation of the PON 100.

ITU-T study group 15 proposes high data rates in excess of what the single wavelength channel capacity in ITU-T G.989.1 provides. Those data rates necessitate that the ONUs 120 simultaneously operate at two or more wavelengths. IEEE proposes at least three architectures for an NG-EPON, including an SSD-WDM-PON and a wavelength-agile PON. Those PONs also necessitate that the ONUs 120 simultaneously operate at two or more wavelengths. To operate at two or more wavelengths, the ONUs 120 may be transceiver-arrayed ONUs. Transceiver-arrayed ONUs refer to ONUs that have multiple transceivers, which in this case operate at different wavelengths. However, each transceiver consumes power, so transceivers unnecessarily consume power when they are not actively transmitting or receiving. The ONU power-saving mechanism 200 and the ONU power-saving mechanism 300 are for ONUs with only a single transmitter and a single receiver, so they do not address transceiver-arrayed ONUs.

Disclosed herein are embodiments for selective channel control in multi-channel PONs. The embodiments provide mechanisms for transceiver-arrayed ONUs to selectively turn on and turn off individual transceivers. Turning on may be used interchangeably with activation and enablement, and turning off may be used interchangeably with deactivation and disablement. In this context, channels are associated with wavelengths. For instance, using active channels, an OLT transmits messages to ONUs. The messages comprise wavelength channel ID information that signals to individual inactive transceivers, or transmitters or receivers within those transceivers, that they should turn on or turn off. If the OLT desires to instruct an ONU to turn on or turn off multiple transceivers, then the OLT transmits a different message for each of the transceivers, messages for a plurality of the transceiver, or a single message for all of the transceivers. By turning off individual transceivers, the ONUs may conserve power. Thus, messages instructing turning off of transceivers may be referred to as power-conserving control messages. Though channels are discussed as being associated with wavelengths, they may be associated with other concepts. Though ONUs with four transceivers are discussed, the disclosed embodiments apply to ONUs with any number of transceivers.

Figure 4:
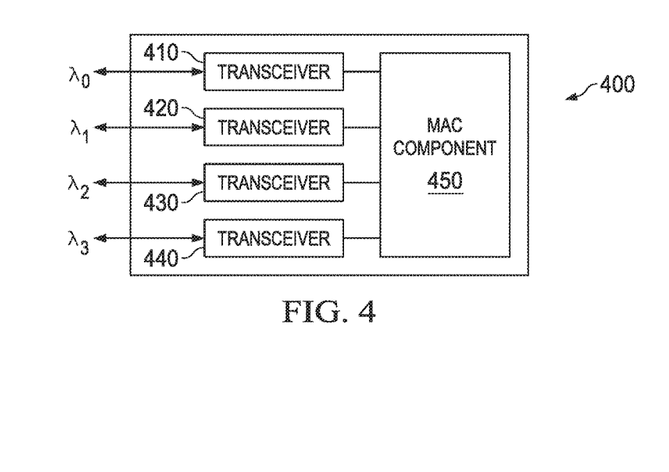
FIG. 4 is a schematic diagram of a transceiver-arrayed ONU.

FIG. 4 is a schematic diagram of a transceiver-arrayed ONU 400. The ONU 400 may implement one of the ONUs 120. The ONU 400 comprises a transceiver 410 operating at channel 0 denoted as $\lambda_0$, a transceiver 420 operating at channel 1 denoted as $\lambda_1$, a transceiver 430 operating at channel 2 denoted as $\lambda_2$, a transceiver 440 operating at channel 3 denoted as $\lambda_3$, and a MAC component 450 coupled to the transceivers 410-440. Each channel has an associated channel ID. As an example, each of the transceivers 410-440 and their corresponding channels has a 10

Gb/s capacity. Using all four of the transceivers 410-440, the ONU 400 therefore has a 40 Gb/s capacity.

The transceivers 410-440 comprise a transmitter and a receiver. The transmitter receives electrical signals from the MAC component 450, converts the electrical signals into optical signals, and transmits the optical signals to the OLT 110 in FIG. 1. The receiver receives optical signals from the OLT 110, converts the optical signals into electrical signals, and passes the electrical signals to the MAC component 450. The MAC component 450 processes the electrical signals and instructs the ONU 400 accordingly. For instance, upon receiving a power-conserving control message instructing the transceiver 410 to turn off, the MAC component 450 instructs the transceiver 410 to turn off. Though the ONU 400 is shown as comprising four transceivers 410-440, the ONU 400 may have any suitable number of transceivers.

The ONU 400 may selectively turn on or turn off any number of the transceivers 410-440 in at least the following three cases. Messages for implementing the cases are described with respect to the figures below. The OLT 110 and the ONU 400 implement the cases in any suitable manner. For instance, the OLT 110 instructs the ONU 400 to perform channel activation or deactivation, and the ONU 400 complies and optionally provides to the OLT 110 confirmation of compliance. Alternatively, the ONU 400 requests channel activation or deactivation, the OLT 110 either grants or does not grant permission, and the ONU 400 optionally provides to the OLT 110 confirmation of compliance. Alternatively, the ONU 400 unilaterally performs channel activation or deactivation and optionally notifies the OLT 110.

In a first case, traffic to and from the ONU 400 is lighter than the capacity of three of the transceivers 410-440. The ONU 400 turns off one of the transceivers 410-440, for instance the transceiver 410. The OLT 110 may instruct the ONU 400 to do so. If the traffic subsequently becomes heavier or the ONU 400 desires to communication at a higher capacity, then the ONU 400 may turn on the transceiver 410.

In a second case, the OLT 110 operates less than all four of the channels. The OLT 110 informs the ONU 400 of the channels that the OLT 110 is operating. The ONU 400 turns off the transceivers 410-440 corresponding to the channels that the OLT 110 is not operating. The OLT 110 may instruct the ONU 400 to do so. If the OLT 110 subsequently operates those channels, then the ONU 400 may turn on the transceivers 410-440 corresponding to those channels.

In a third case, when traffic is very light or the ONU 400 is in an activation process, the ONU 400 turns on only one of the transceivers 410-440, for instance the transceiver 410. The transceiver 410 processes all wake-up messages, activation messages, and other messages. The OLT 110 may determine that the ONU 400 is in the activation process, determine the transceiver 410 as the only one of the transceivers 410-440 in operation, and instruct the ONU 400 to disable the remaining transceivers 420-440. If the ONU 400 transitions from the activation process to normal operation, then the ONU 400 may turn on additional transceivers 410-440.

Figure 5:
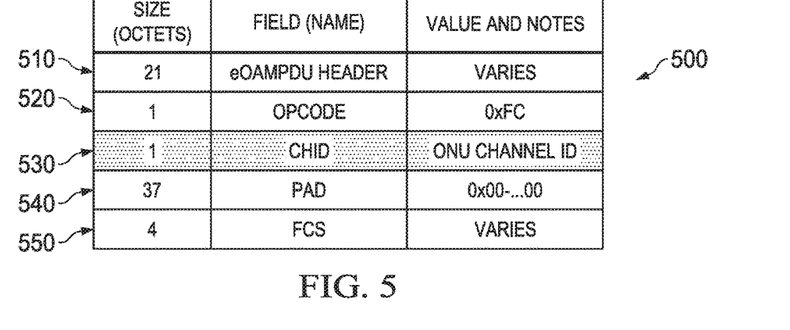
FIG. 5 is an early wake-up OLT message according to an embodiment of the disclosure.

FIG. 5 is an early wake-up OLT message 500 according to an embodiment of the disclosure. The early wake-up OLT message 500 may implement the OAMPDU structure described in IEEE P1904.1, which is incorporated by reference. The OLT 110 transmits the early wake-up OLT message 500 to the ONU 400 when the PON 100 is an EPON.

The early wake-up OLT message 500 comprises an eOAMPDU header field 510 of 21 octets and varying values, an opcode field 520 of 1 octet and a value of 0xFC, a CHID field 530 of 1 octet and value corresponding to an ONU channel ID, a pad field 540 of 37 octets and a value of 0x00 . . . 00, and an FCS field 550 of 4 octets and varying values. The fields may comprise other suitable sizes and values. The opcode field 520 commands the ONU 400 to instruct a transceiver 410-440 corresponding to the CHID field 530 to leave a sleep state, for instance the sleep aware state 230 or the asleep state 240, and enter an active state, for instance either the active held state 210 or the active free state 220 in FIG. 2. The value of the CHID field 530 indicates an ONU channel ID, specifically channel 0, channel 1, channel 2, or channel 3. The MAC component 450 determines the transceiver 410-440 corresponding to the channel ID and instructs that transceiver 410-440 to leave the sleep state and enter the active state.

Figure 6:
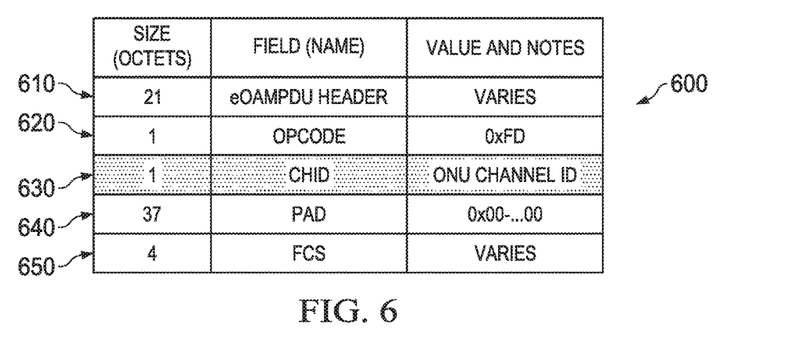
FIG. 6 is an early wake-up ONU message according to an embodiment of the disclosure.

FIG. 6 is an early wake-up ONU message 600 according to an embodiment of the disclosure. The early wake-up ONU message 600 may further implement the OAMPDU structure described in IEEE P1904.1. The ONU 400 transmits the early wake-up ONU message 600 to the OLT 110 when the PON 100 is an EPON and in response to receiving and responding to the early wake-up OLT message 500.

The early wake-up ONU message 600 comprises an eOAMPDU header field 610 of 21 octets and varying values, an opcode field 620 of 1 octet and a value of 0xFD, a CHID field 630 of 1 octet and a value corresponding to an ONU channel ID, a pad field 640 of 37 octets and a value of 0x00 . . . 00, and an FCS field 650 of 4 octets and varying values. The fields may comprise other suitable sizes and values. The opcode field 620 indicates that a transceiver 410-440 of the ONU 400 corresponding to the CHID field 630 left a sleep state and entered an active state. The value of the CHID field 630 indicates an ONU channel ID and thus the transceiver 410-440 corresponding to the ONU channel ID.

Figure 7A:
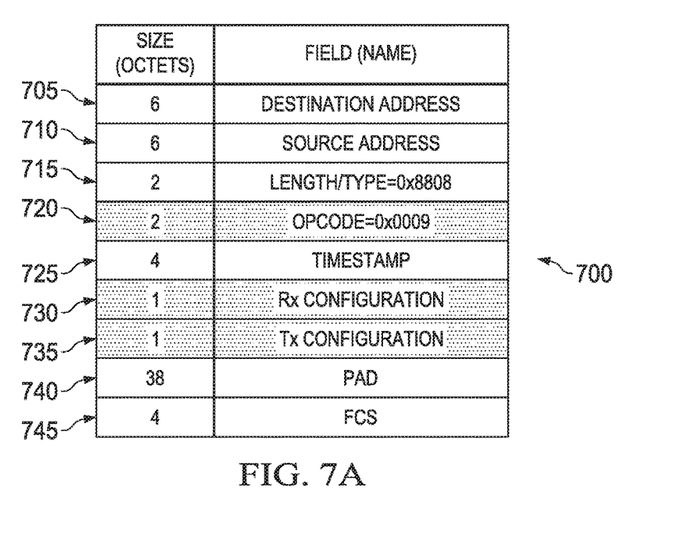
FIG. 7A is a channel configuration MPCPDU message according to an embodiment of the disclosure.

FIG. 7A is a channel configuration power conservation MPCPDU message 700 according to an embodiment of the disclosure. The channel configuration power conservation MPCPDU message 700 may implement the MPCPDU structure described in IEEE 802.3, Section Five, 2012, which is incorporated by reference. The OLT transmits the channel configuration power conservation MPCPDU message 700 to the ONU 400 when the PON 100 is an EPON.

The channel configuration power conservation MPCPDU message 700 comprises a destination address field 705 of 6 octets, a source address field 710 of 6 octets, a length/type field 715 of 2 octets and a value of 0x8808, an opcode field 720 of 2 octets and a value of 0x0009, a timestamp field 725 of 4 octets, an Rx configuration field 730 of 1 octet, a Tx configuration field 735 of 1 octet, a pad field 740 of 38 octets, and an FCS field 745 of 4 octets. The fields may comprise other suitable sizes and values. The opcode field 720 commands the ONU 400 to instruct the receivers of the transceivers 410-440 to turn on or turn off according to the Rx configuration field 730, and the opcode field 720 commands the ONU 400 to instruct the transmitters of the transceivers 410-440 to turn on or turn off according to the Tx configuration field 735.

Figure 7B:
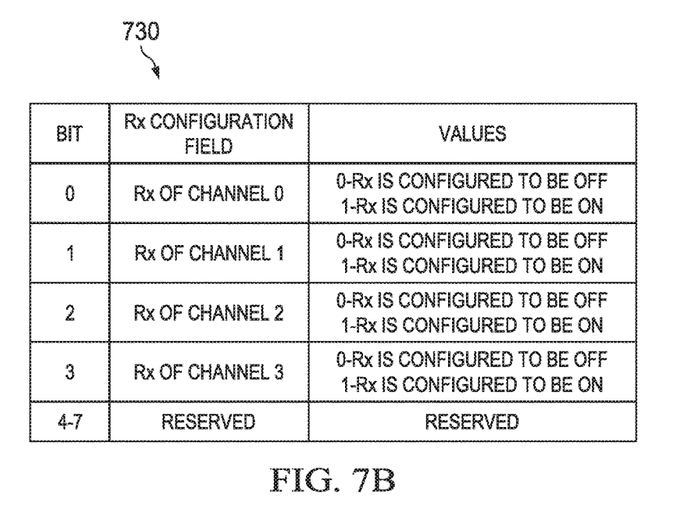
FIG. 7B shows values for the Rx configuration field in the channel configuration power conservation MPCPDU message in FIG. 7A according to an embodiment of the disclosure.

FIG. 7B shows values for the Rx configuration field 730 in the channel configuration power conservation MPCPDU message 700 in FIG. 7A according to an embodiment of the disclosure. The values in FIG. 7B show the various combinations of off and on states that each receiver of the transceivers 410-440 may have. For instance, a value of 0110 for the Rx configuration field 730 commands the ONU 400 to turn off the receiver of the transceiver 410, turn on the receiver of the transceiver 420, turn on the receiver of the transceiver 430, and turn off the receiver of the transceiver 440.

Figure 7C:
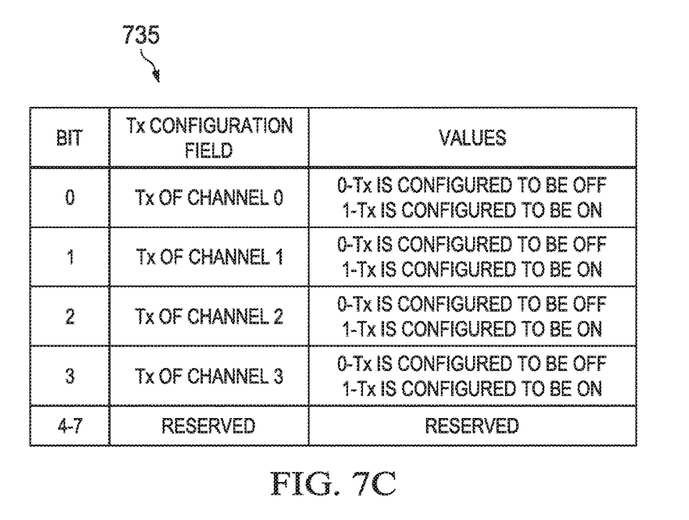
FIG. 7C shows values for the Tx configuration field in the channel configuration power conservation MPCPDU message in FIG. 7A according to an embodiment of the disclosure.

FIG. 7C shows values for the Tx configuration field 735 in the channel configuration power conservation MPCPDU message 700 in FIG. 7A according to an embodiment of the disclosure. The values in FIG. 7C show the various combinations of off and on states that each receiver and transmitter of the transceivers 410-440 may have. For instance, a value of 0110 for the Tx configuration field 735 commands the ONU 400 to turn off the transmitter of the transceiver 410, turn on the transmitter of the transceiver 420, turn on the transmitter of the transceiver 430, and turn off the transmitter of the transceiver 440.

Figure 8:
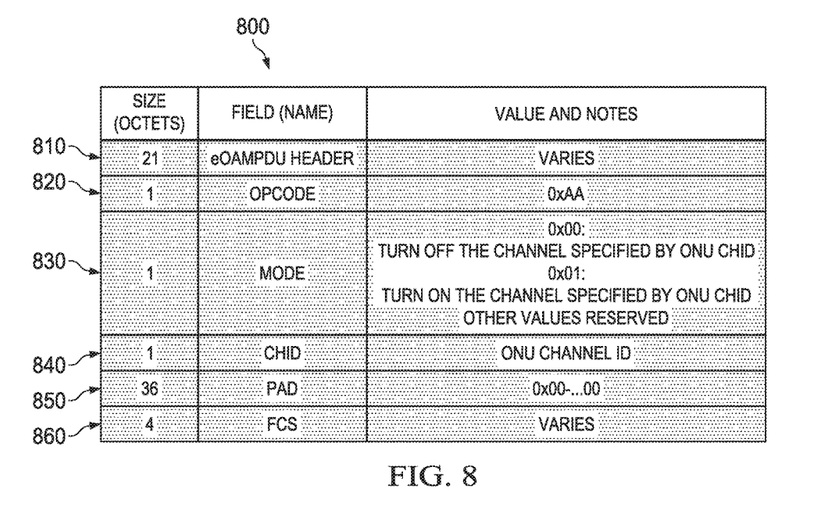
FIG. 8 is a channel power control eOAMPDU message according to an embodiment of the disclosure.

FIG. 8 is a channel power control eOAMPDU message 800 according to an embodiment of the disclosure. The channel power control eOAMPDU message 800 may implement the eOAMPDU structure described in IEEE P1904.1. The OLT 110 transmits the channel power control eOAMPDU message 800 to the ONU 400 when the PON 100 is an EPON.

The channel power control eOAMPDU message 800 comprises an eOAMPDU header field 810 of 21 octets and varying values, an opcode field 820 of 1 octet and a value of 0×AA, a mode field 830 of 1 octet and a value of either 0×00 or 0×01, a CHID field 840 of 1 octet and a value corresponding to an ONU channel ID, a pad field 850 of 36 octets and a value of 0×00 . . . 00, and an FCS field 860 of 4 octets and varying values. The fields may comprise other suitable sizes and values. The mode field 830 commands the ONU 400 to instruct a transceiver 410-440 corresponding to the CHID field 840 to turn on or turn off. The value of the CHID field 840 indicates an ONU channel ID.

Figure 9:
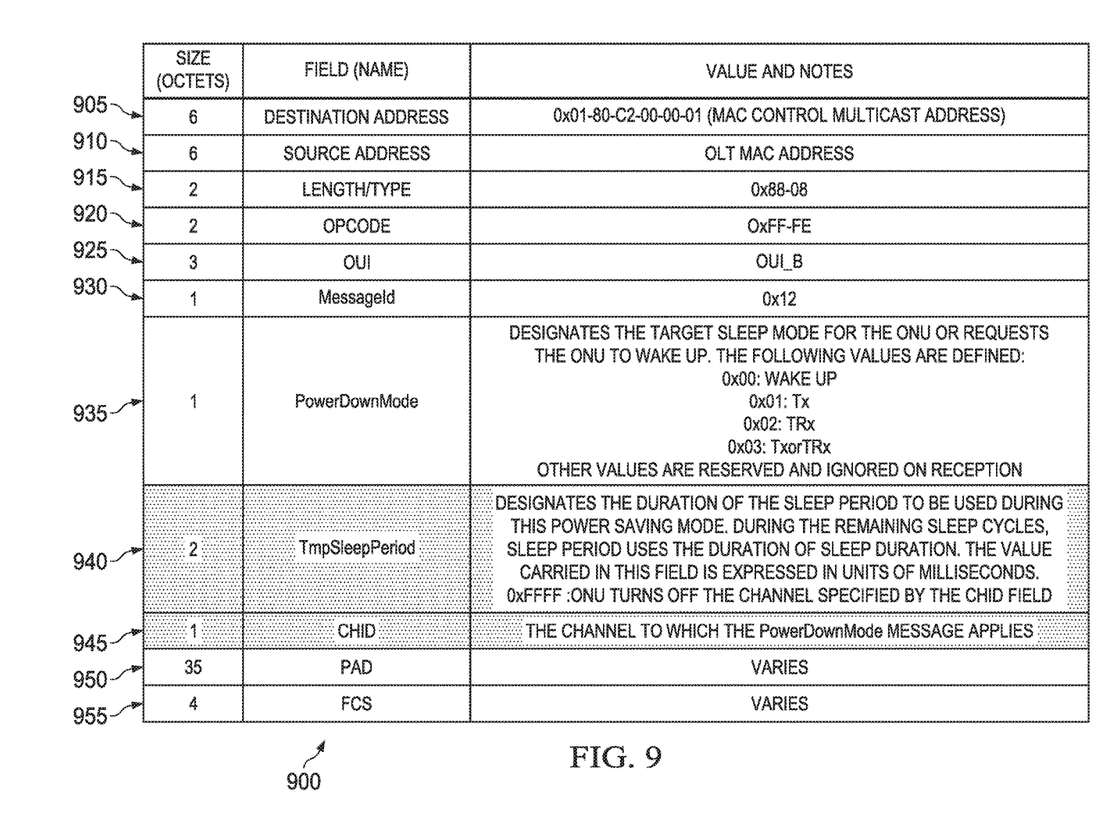
FIG. 9 is a channel power control eMPCPDU message according to an embodiment of the disclosure.

FIG. 9 is a channel power control eMPCPDU message 900 according to an embodiment of the disclosure. The channel power control eMPCPDU message 900 may implement the eMPCPDU structure described in IEEE P1904.1. The OLT 110 transmits the channel power control eMPCPDU message 900 to the ONU 400 when the PON 100 is an EPON.

The channel power control eMPCPDU message 900 comprises a destination address field 905 of 6 octets and a value of 0×01-80-C2-00-00-1 corresponding to a MAC multicast address; a source address field 910 of 6 octets and a value corresponding to a MAC address of the OLT 110; a length/type field 915 of 2 octets and a value of 0×00-08; an opcode field 920 of 2 octets and a value of 0×FF-FE; an OUI field 925 of 3 octets and a value of OUI B; a messageId field 930 of 1 octet and a value of 0×12; a PowerDownMode field 935 of 1 octet and a value of 0×00, 0×01, 0×02, or 0×03; a TmpSleepPeriod field 940 of 2 octets and a value of 0×FFFF; a CHID field 945 of 1 octet and a value corresponding to a channel ID; a pad field 950 of 35 octets and varying values; and an FCS field 955 of 4 octets and varying values. The fields may comprise other suitable sizes and values. The TmpSleepPeriod field 940 commands the ONU 400 to instruct a transceiver 410-440 corresponding to the CHID field 945 to turn off. The value of the CHID field 945 indicates an ONU channel ID.

Figure 10:
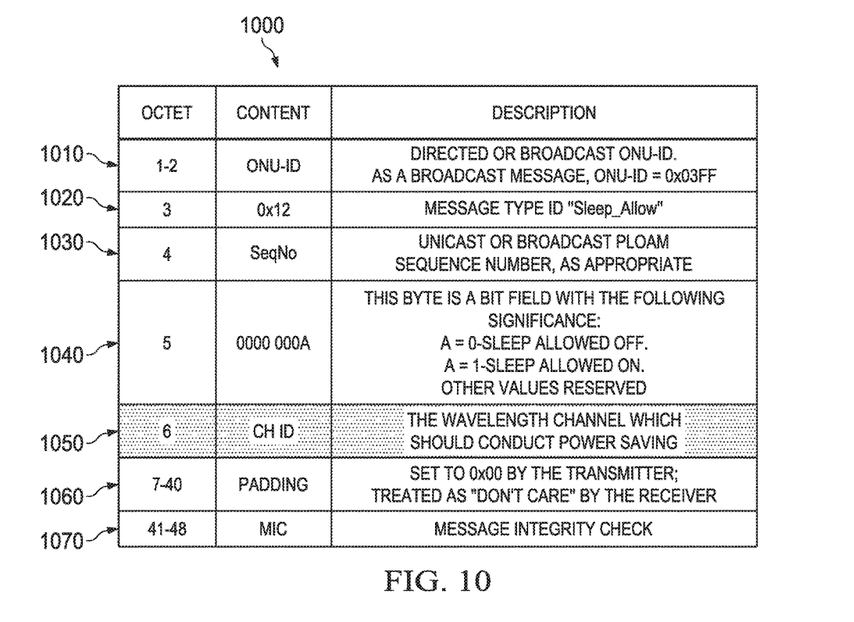
FIG. 10 is a sleep allow message according to an embodiment of the disclosure.

FIG. 10 is a sleep allow message 1000 according to an embodiment of the disclosure. The sleep allow message 1000 may implement the sleep allow structure described in ITU-T G.989.3, which is incorporated by reference. The OLT 110 transmits the sleep allow message 1000 to the ONU 400 when the PON 100 is a GPON, an NG-PON2s, or an XGPON1s.

The sleep allow message 1000 comprises an ONU-ID field 1010 of 1-2 octets and a value of 0×03FF, a 0×12 field 1020 of 3 octets and a value of 0×01, a SeqNo field 1030 of 4 octets and a value corresponding to a unicast or broadcast PLOAM sequence number, a 0000 000A field 1040 of 5 octets and an A value of 0 or 1, a CH ID field 1050 of 6 octets and a value corresponding to a channel ID, a padding field 1060 of 7-40 octets and a value of 0×00, and a MIC field 1070 of 41-48 octets and a value providing a message integrity check. The fields may comprise other suitable sizes and values. The 0000 000A field 1040 indicates whether the ONU 400 may instruct a transceiver 410-440 corresponding to the CH ID field 1050 to enter a sleep state. The value of the CH ID field 1050 indicates an ONU channel ID.

Figure 11:
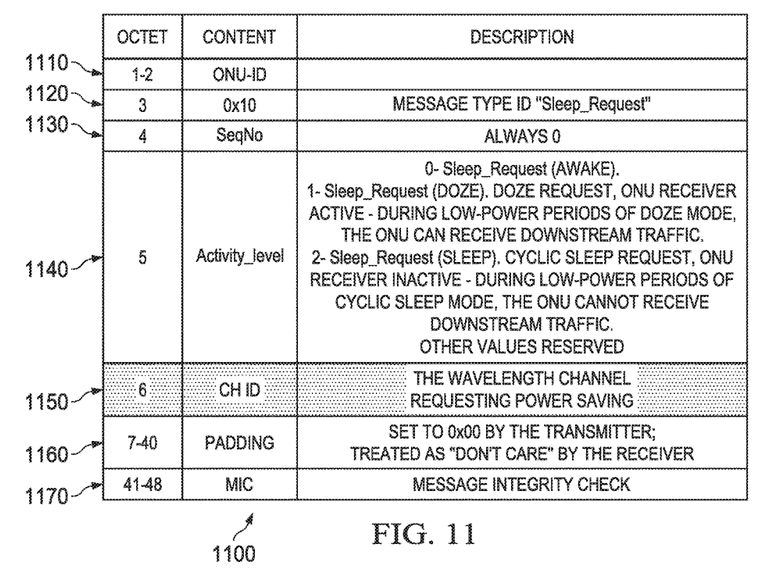
FIG. 11 is a sleep request message according to an embodiment of the disclosure.

FIG. 11 is a sleep request message 1100 according to an embodiment of the disclosure. The sleep request message 1100 may implement the sleep request structure described in ITU-T G.989.3. The ONU 400 transmits the sleep request message 1100 to the OLT 110 when the PON 100 is a GPON, an NG-PON2s, or an XGPON1s.

The sleep request message 1100 comprises an ONU-ID field 1110 of 1-2 octets and a value corresponding to an ONU ID; a 0×10 field 1120 of 3 octets and a value of 0×10; a SeqNo field 1130 of 4 octets and a value of 0; an Activity level field 1140 of 5 octets and a value of 0, 1, or 2; a CH ID field 1150 of 6 octets and a value corresponding to a channel ID; a padding field 1160 of 7-40 octets and a value of 0×00; and a MIC field 1170 of 41-48 octets and a value providing a message integrity check. The fields may comprise other suitable sizes and values. The value of the CH ID field 1150 indicates an ONU channel ID, and thus a corresponding transceiver 410-440, that the ONU 400 desires to enter a sleep state.

Figure 12:
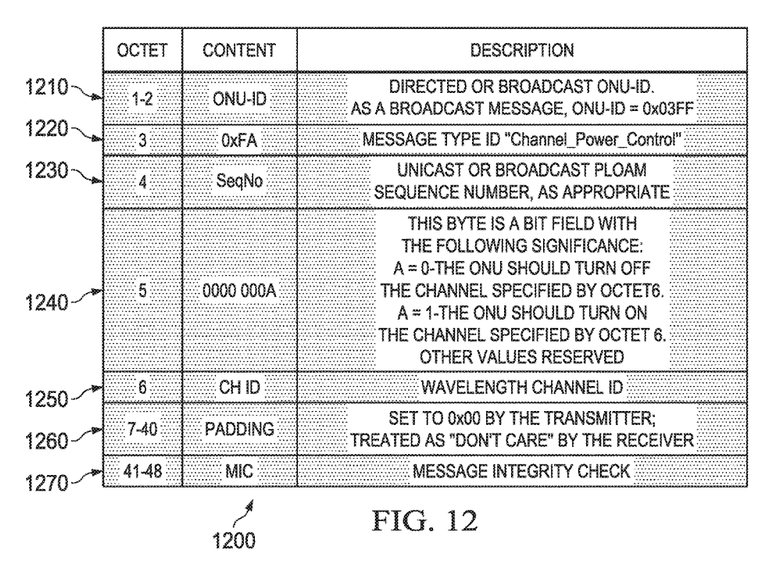
FIG. 12 is a channel power control message according to an embodiment of the disclosure.

FIG. 12 is a channel power control message 1200 according to an embodiment of the disclosure. The channel power control message 1200 may be a PLOAM message in ITU-T G.989.3. The OLT 110 transmits the channel power control message 1200 to the ONU 400 when the PON 100 is a GPON, an NG-PON2s, or an XGPON1s.

The channel power control message 1200 comprises an ONU-ID field 1210 of 1-2 octets and a value of 0×03FF, a 0×FA field 1220 of 3 octets and a value of 0×FA, a SeqNo field 1230 of 4 octets and a value corresponding to a unicast or broadcast PLOAM sequence number, a 0000 000A field 1240 of 5 octets and an A value of 0 or 1, a CH ID field 1250 of 6 octets and value corresponding to a wavelength channel ID, a padding field 1260 of 7-40 octets and a value of 0×00, and a MIC field 1270 of 41-48 octets and providing a message integrity check. The fields may comprise other suitable sizes and values. The 0000 000A field 1240 commands the ONU 400 to instruct a transceiver 410-440 corresponding to the CH ID field 1250 to turn on or turn off. The value of the CH ID field 1250 indicates an ONU channel ID.

Figure 13:
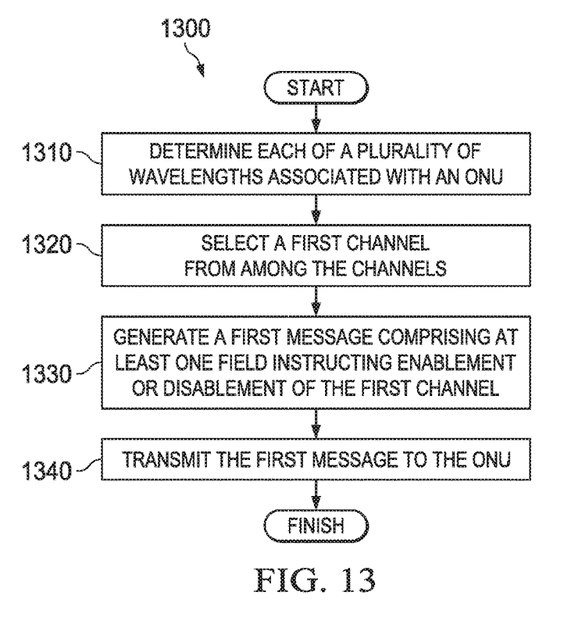
FIG. 13 is a flowchart illustrating a method of selective channel control in multi-channel PONs according to an embodiment of the disclosure.

FIG. 13 is a flowchart illustrating a method 1300 of selective channel control in multi-channel PONs according to an embodiment of the disclosure. The OLT 110 implements the method 1300. At step 1310, each of a plurality of channels associated with an ONU is determined. For instance, the OLT 110 determines that the ONU 400 communicates using channels 0-3. At step 1320, a first channel from among the channels is selected. For instance, the OLT 110 selects channel 0. At step 1330, a first message comprising at least one field instructing enablement or disablement of the first channel is generated. For instance, the OLT 110 generates the channel configuration power conservation MPCPDU message 700 comprising the opcode field 720, the Rx configuration field 730, and the Tx configuration field 735. Finally, at step 1340, the first message is transmitted to the ONU. For instance, the OLT 110 transmits the channel configuration power conservation MPCPDU message 700 to the ONU 400.

Figure 14:
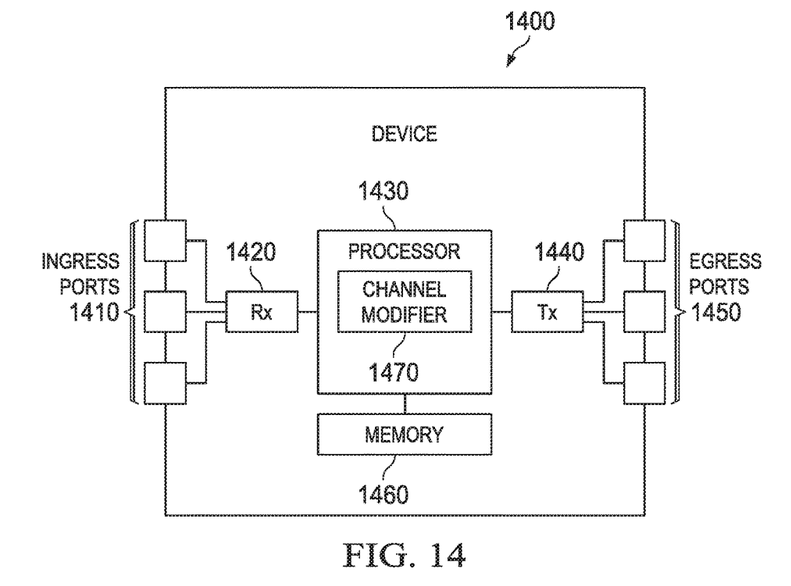
FIG. 14 is a schematic diagram of a network device according to an embodiment of the disclosure.

FIG. 14 is a schematic diagram of a device 1400 according to an embodiment of the disclosure. The device 1400 implements the disclosed embodiments. The device 1400 comprises ingress ports 1410 and an RX 1420 for receiving data; a processor, logic unit, or CPU 1430 to process the data; a TX 1440 and egress ports 1450 for transmitting the data; and a memory 1460 for storing the data. The device 1400 may also comprise OE components and EO components coupled to the ingress ports 1410, the RX 1420, the TX 1440, and the egress ports 1450 for ingress or egress of optical signals.

The processor 1430 is any combination of hardware, middleware, firmware, or software. The processor 1430 comprises any combination of one or more CPU chips, cores, FPGAs, ASICs, or DSPs. The processor 1430 communicates with the ingress ports 1410, the RX 1420, the TX 1440, the egress ports 1450, and the memory 1460. The processor 1430 comprises a channel modifier 1470, which implements the disclosed embodiments. The inclusion of the channel modifier 1470 therefore provides a substantial improvement to the functionality of the device 1400 and effects a transformation of the device 1400 to a different state. Alternatively, the memory 1460 stores the channel recovery component 1470 as instructions, and the processor 1430 executes those instructions.

The memory 1460 comprises any combination of disks, tape drives, or solid-state drives. The device 1400 may use the memory 1460 as an over-flow data storage device to store programs when the device 1400 selects those programs for execution and to store instructions and data that the device 1400 reads during execution of those programs. The memory 1460 may be volatile or non-volatile and may be any combination of ROM, RAM, TCAM, or SRAM.

In an example embodiment, an OLT comprises a memory element; a processor element coupled to the memory element and configured to determine each of a plurality of channels associated with an ONU, select a first channel from among the channels, and generate a first message comprising at least one field instructing enablement or disablement of the first channel; and a transmitter element coupled to the processor element and configured to transmit the first message to the ONU.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
   a memory;
   a processor coupled to the memory and configured to:
      make a first determination that an optical network unit (ONU) is in an activation process,
      make a second determination that a first transceiver of a plurality of transceivers in the ONU is in operation for the activation process,
      generate, in response to the first determination and the second determination, a first message instructing the ONU to disable each transceiver of the plurality of transceivers except for the first transceiver,
      determine, after generating the first message, that the ONU is in normal operation,
      determine each of a plurality of channels associated with the ONU,
      select a first channel from among the channels, and
      generate a second message comprising at least one field instructing enablement of the first channel; and
   a transmitter coupled to the processor and configured to:
      transmit the first message to the ONU, and
      transmit, after transmitting the first message, the second message to the ONU.

2. The OLT of claim 1, wherein each of the channels is associated with one of the transceivers.

3. The OLT of claim 1, wherein each of the channels corresponds to a different wavelength.

4. The OLT of claim 1, wherein the at least one field comprises a channel identification (CHID) field identifying the first channel.

5. The OLT of claim 1, wherein the processor is further configured to:
   make a third determination that the ONU is communicating traffic at less than a capacity of the plurality of transceivers in the ONU; and
   instruct, based on the third determination and via the at least one field, the ONU to disable one of the transceivers.

6. The OLT of claim 1, wherein the processor is further configured to:
   make a third determination that the OLT is not operating the first channel; and
   instruct, based on the third determination and via the at least one field, the ONU to disable a transceiver of the ONU corresponding to the first channel.

7. The OLT of claim 1, further comprising a receiver configured to receive from the ONU a third message comprising a confirmation of the enablement.

8. An optical network unit (ONU) comprising:
   a first transceiver comprising a first transmitter and a first receiver;
   a second transceiver comprising a second transmitter and a second receiver; and
   a media access control (MAC) component coupled to the first transceiver and the second transceiver and configured to:
      process a first message from an optical line terminal (OLT), the first message comprises at least one field instructing enablement or disablement of a first channel and a second channel, the at least one field comprises an operation code (opcode) field, a receiver (Rx) configuration field, and a transmitter (Tx) configuration field, the opcode field commands the ONU to instruct the first receiver and the second receiver to enable or disable based on the Rx configuration field, and the opcode field commands the ONU to instruct the first transmitter and the second transmitter to enable or disable based on the Tx configuration field, determine that the first transceiver is associated with the first channel, instruct the first transmitter to enable or disable based on the at least one field, instruct the first receiver to enable or disable based on the at least one field, determine that the second transceiver is associated with the second channel, instruct the second transmitter to enable or disable based on the at least one field, and instruct the second receiver to enable or disable based on the at least one field.

9. The ONU of claim 8, wherein the first receiver or the second receiver is configured to receive the first message.

10. The ONU of claim 8, wherein the first receiver and the second receiver are configured to receive the first message.

11. The ONU of claim 8, wherein the MAC component is further configured to generate a second message comprising a confirmation of the enablement or the disablement.

12. The ONU of claim 11, wherein the first transmitter or the second transmitter is configured to transmit the second message to the OLT.

13. The ONU of claim 11, wherein the first transmitter and the second transmitter are configured to transmit the second message to the OLT.

14. The ONU of claim 11, wherein the first channel corresponds to a first wavelength, and wherein the second channel corresponds to a second wavelength.

15. A method implemented in an optical line terminal (OLT), the method comprising:

making a first determination that an optical network unit (ONU) is in an activation process;

making a second determination that a first transceiver of a plurality of transceivers in the ONU is in operation for the activation process;

generating, in response to the first determination and the second determination, a first message instructing the ONU to disable each transceiver of the plurality of transceivers except for the first transceiver;

determining, after generating the first message, that the ONU is in normal operation;

determining each of a plurality of channels associated with the ONU;

selecting a first channel from among the channels;

generating a second message comprising at least one field instructing enablement of the first channel;

transmitting the first message to the ONU; and transmitting, after transmitting the first message, the second message to the ONU.

16. The method of claim 15, further comprising:

making a third determination that the ONU desires to communicate traffic at a higher capacity; and instructing, based on the third determination and via the at least one field, the ONU to enable one of the transceivers.

17. The method of claim 15, further comprising:

making a third determination that the OLT will begin operation of a first channel; and instructing, based on the third determination and via the at least one field, the ONU to enable one of the transceivers corresponding to the first channel.

* * * * *

UNITED STATES PATENT AND TRADEMARK OFFICE
CERTIFICATE OF CORRECTION

PATENT NO. : 10,181,924 B2
APPLICATION NO. : 15/473273
DATED : January 15, 2019
INVENTOR(S) : Xuming Wu et al.

It is certified that error appears in the above-identified patent and that said Letters Patent is hereby corrected as shown below:

On the Title Page

Page 2, Other Publications, Lines 7-10, should read:
"IEEE P1904.1™ /D3.4 Draft Standard for Service Interoperability in Ethernet Passive Optical Networks (SIEPON)," Standards Development Board of the IEEE Communications Society, Apr. 2013, 829 pages.

Signed and Sealed this
Nineteenth Day of February, 2019

Andrei Iancu
*Director of the United States Patent and Trademark Office*